United States Patent Office 3,778,497
Patented Dec. 11, 1973

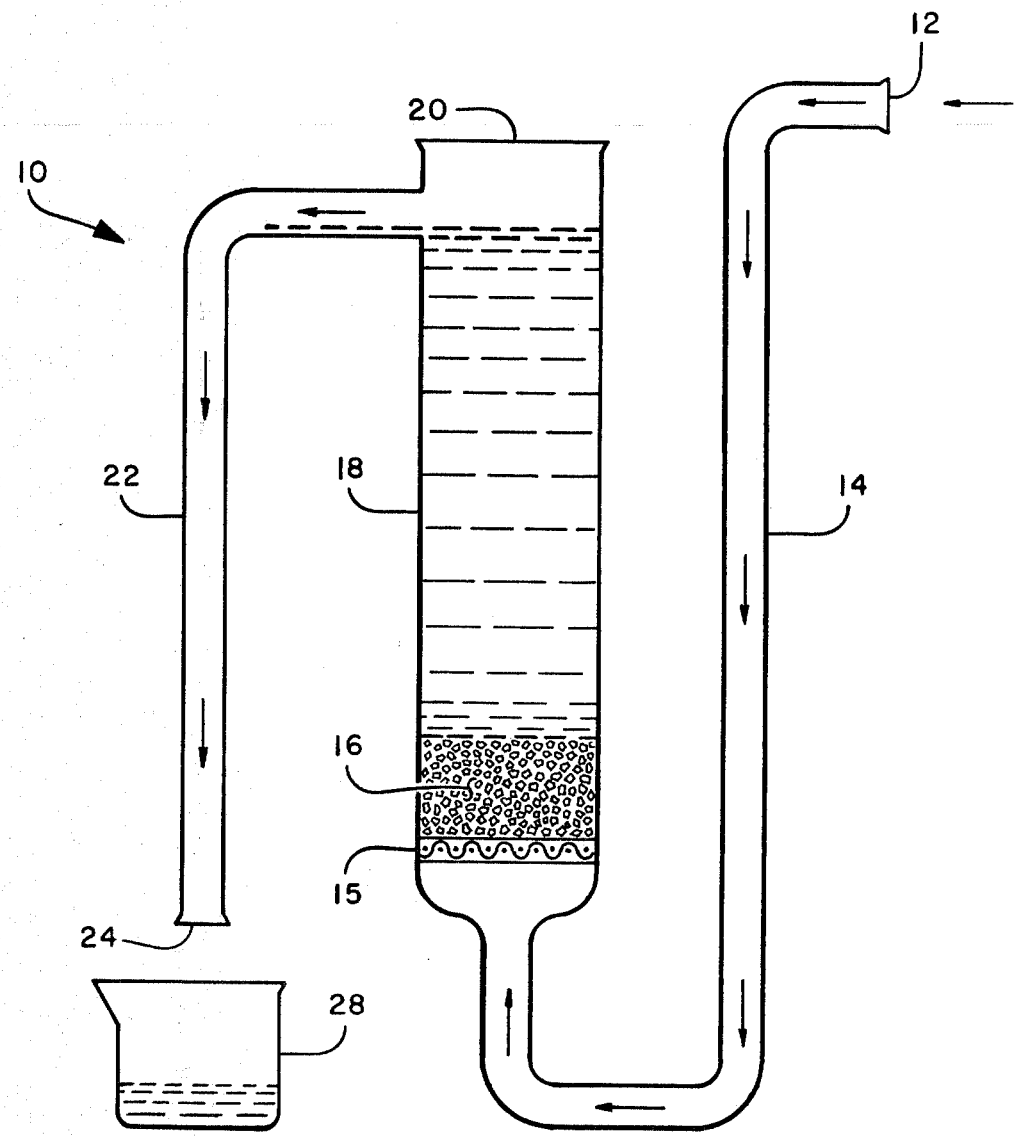

---

3,778,497
PLUTONIUM RECOVERY FROM ORGANIC MATERIALS
Ronald L. Deaton, Germantown, and Gary L. Silver, Centerville, Ohio, assignors to the United States of America as represented by the United States Atomic Energy Commission
Filed July 28, 1972, Ser. No. 276,210
Int. Cl. C01f 13/00
U.S. Cl. 423—2                                5 Claims

ABSTRACT OF THE DISCLOSURE

The invention comprises a method for removing plutonium or the like from organic material wherein the organic material is leached with a solution containing a strong reducing agent such as titanium (III) ($Ti^{+3}$), chromium (II) ($Cr^{+2}$), vanadium (II) ($V^{+2}$) ions, or ferrous ethylenediaminetetraacetate (EDTA), the leaching yielding a plutonium containing solution which is further processed to recover plutonium. The leach solution may also contain citrate or tartrate ion.

BACKGROUND OF INVENTION

A problem encountered in processing plutonium (Pu) solutions is recovering Pu from areas and materials where such Pu solutions may have been inadvertently spilled. Since Pu may frequently be handled in nitric acid solutions, the necessity of recovering the Pu from the areas on which the Pu solution has been spilled is compounded, especially if the Pu solution is accidentally spilled onto combustible material. Recovery from combustible materials may prevent or eliminate a combustion hazard, avert potential economic loss due to the high cost of Pu, and may possibly prevent or avert an exposure of personnel to highly toxic radioisotopic material.

There are various methods to recover Pu from materials as described above. These may be: (1) ignition of the recoverable material to convert the Pu to the oxide if the material is combustible, followed by dissolution of the plutonium oxide formed in suitable acid; (2) fusion of the material with an inorganic salt, such as potassium pyrosulfate, at a high temperature if the plutonium oxide is in a refractory form and if such fusion is safe; and (3) leaching the Pu from the recoverable material with an acid, such as hot nitric acid ($HNO_3$) containing hydrofluoric acid (HF).

The recovery techniques described above suffer from several disadvantages. For example in (1), the ignition process requires an incinerator and might accidentally lead to an explosion if it is desired to burn organic materials previously soaked with $HNO_3$. In (2) the fusion process requires high temperatures and admission of foreign salts into the Pu system thereby necessitating further reprocessing in order to remove these salts. In (3) the leaching process described may increase the hazardous nature of recoverable material because of the use of $HNO_3$. This process may also require long leaching periods and, finally, may be relatively ineffective.

Materials on which Pu solutions have previously been spilled because of an accident or the like, include such organic materials as hydrocarbons, polyethylene beads, and cellulosic materials such as redwoods. If these materials are allowed to stand without separation or recovery of the Pu material, the acid, heat and radioactivity associated with a radioisotope, such as plutonium-238, may deteriorate, char and render the hydrocarbon, polyethylene beads, and cellulosic materials such as redwood shingles into an amorphous mass. Prior efforts to recover the Pu content from such an amorphous mass by means of process (1), i.e., ignition of the recoverable material as described hereinabove, is not effective since the amorphous mass evolves a dense smoke which clogs air filters in the incinerator. Furthermore, it has been shown that materials onto which Pu solutions have been spilled are combusted with unexpected rapidity and violence when heated and therefore are not safetly fused as described in process (2). Boiling the material with a mixture of concentrated $HNO_3$ containing HF to recover the Pu using process (3) is inefficient as prolonged periods of boiling (several hours) and frequent changes of leach acid are required to recover from 50% to 90% of the Pu.

SUMMARY OF THE INVENTION

In view of the above described limitations and drawbacks in prior art processes, it is an object of this invention to provide a method of separating or recovering radioisotopic material such as Pu from organic materials.

It is an object of this invention to provide a method of recovery of Pu or other radioisotopic materials from organic materials containing these radioisotopic materials, which method is fast and efficient.

It is a further object of this invention to provide a method for separating or recovering radioisotopic materials from organic waste materials.

It is a further object of this invention to provide a method of recovering Pu from organic waste materials, which method does not increase the combustibility of the organic material.

It is a further object of this invention to provide a method of recovering Pu or other radioisotopic materials from organic materials, which method uses a solution which reacts with the "nitro" groups in the organic materials converting same to amine groups, and which conversion results in a minimization or reduction of the combustion properties of the organic material.

Various other objects and advantages will become apparent from the following description of this invention, and the most novel features will be pointed out with particularity hereinafter in connection with the appended claims. It is understood that various changes in the details, materials and process steps which are herein described and illustrated to better explain the nature of the invention may be made by those skilled in the art without departing from the scope of this invention. The present invention is not restricted to the recovery of Pu since various other radioisotopic materials or actinides such as cerium, americium and thallium, may be recovered by the process described herein.

The invention comprises, in brief, contacting an organic material containing a radioisotopic material such as Pu-238 with a leaching solution taken from the group consisting of $Ti^{+3}$ halide, $Cr^{+2}$ halide, $V^{+2}$ halide, $Ti^{+3}$ sulfate, $Cr^{+2}$ sulfate, $V^{+2}$ sulfate, ferrous ethylenediaminetetraacetate (Fe II EDTA) and mixtures thereof, the leaching yielding a radioisotopic material (such as Pu-238) containing solution, and separating or recovering this radioisotopic material containing solution. The leach solution may also contain citrate or tartrate ions.

DESCRIPTION OF DRAWING

The drawing is a diagrammatic view of an apparatus suitable for performing this process.

DETAILED DESCRIPTION

The apparatus 10 illustrated in the drawing may be used for carrying out the process of the present invention. As shown in the drawing, leaching solution may be input or fed in through opening 12 of conduit or arm 14. The leaching solution flows through conduit or arm 14 and passes through frit or screen 15 which serves the purpose of maintaining or retaining the radioisotopic material bearing organic material 16 in location within reaction tube 18. The radioisotopic material used in the description is plutonium but as stated hereinabove, the invention also applies to americium, cerium, thallium, etc. Pu bearing materials 16 may be any organic waste materials as described hereinabove such as polyethylene material balls or beads, hydrocarbons, and other materials such as celluloses, woods, etc., in any number of forms. The leaching solution flow goes through the bottom of the Pu bearing materials so that thorough permeation, penetration, or contact with the Pu bearing materials is made. Suitable leaching solutions for use are such as from about 0.01 Molar (M) to about 2.0 titanium (III) chloride (TiCl$_3$) in about or less than 4 M hydrochloric acid (HCl), from about 0.01 M to about 2.0 M chromium (II) chloride (CrCl$_2$) in about or less than 1 M HCl, from about 0.01 M to about 1.0 M titanium (III) sulfate [Ti$_2$(SO$_4$)$_3$] in about or less than 3 M sulfuric acid (H$_2$SO$_4$), from about 0.01 M to about 1.0 M chromium (II) sulfate (CrSO$_4$) in about or less than 2 M H$_2$SO$_4$, from about 0.01 M to about 1.0 M vanadium (II) chloride (VCl$_2$) in about or less than 2 M HCl, from about 0.01 M to about 1.0 M vanadium (II) sulfate in about or less than 4 M H$_2$SO$_4$ and ferrous EDTA which may be used either in the presence of a small excess of EDTA or uncomplexed iron Fe (II). A concentration of ferrous EDTA in this use may be about or less than 0.05 M ferrous EDTA in about 0.05 M sodium EDTA. In general, any soluble Ti$^{+3}$, Cr$^{+2}$ or V$^{+2}$ salt in a suitable acid solution may be a suitable agent for introducing the Ti$^{+3}$, Cr$^{+2}$ or V$^{+2}$ ions into solution. The leaching solution used may be at a temperature from about 0° C. to about 80° C. and preferably at ambient temperature. Leaching solution may be processed through the organic Pu bearing material at a rate of about 2 to about 15 milliliters per minute, per cm.$^2$ of bed, but this flow rate is not critical. Heating or cooling means (not shown) may be provided to maintain a desired temperature.

The leaching solution may contain a compound taken from the group consisting of an alkali metal citrate, alkali metal tartrate, citric acid and tartaric acid in a concentration of from about 1 to about 10 times the concentration of the reducing agent. The alkali metals herein referred to are such as sodium, potassium and the like and an ammonium salt may also be used.

The frit or screen 15 may have suitable openings as required by the size of the organic material being processed. Diameter sizes of the openings or passageways in the frit or screen are not critical so long as liquid flow is not restricted and organic material being processed cannot fall through the frit or screen.

The organic materials 16 may be in the form of an amorphous mass or in the form they had at the time of the spilling of the acid solution containing such as Pu, or in any other suitable form and may be fed or loaded into the reaction tube 18 by means of opening 20 situated at the upper portion of reaction tube 18. Extending from an upper portion near the top of the reaction tube 18 is an overflow tube 22 to remove leach solution containing Pu from the reaction tube 18. This Pu containing solution may be recovered and removed by means of the overflow tube 22 and the apparatus through opening 24 suitably disposed at an end of overflow tube 22. Recovery may be effected by allowing the solution to drop into a suitable container 28 for transfer to further processing apparatus to isolate the Pu, or end 24 may be connected to other apparatus (not shown) which performs the same Pu isolation and recovery function.

In handling and processing of Pu solutions, there have been, on occasion, instances in which Pu bearing solution was spilled onto a material or area. Pu may generally exist in a variety of oxidation states including the +3, +4 and +6 states. In HNO$_3$ solutions, it may frequently be present in the +4 state. Pu$^{+4}$ may become embedded in the organic matrix and therefore further treatment with HNO$_3$ will not easily remove the Pu$^{+4}$. Pu$^{+4}$ may frequently be bound strongly to oxygen bearing organic materials, such as in cation exchange resins. In order to effect this displacement, in this invention using an embodiment of the apparatus described hereinabove, a suitable leaching agent which is also a strong reducing agent changes the valence state of the Pu within the organic material to make its removal easier. The ions used in the leaching solution may also effectively compete with the Pu or other radioisotope involved for ion binding locations, and further, the type of leaching solution used may react with the organic material and render the organic material less susceptible to uncontrolled combustion by reducing combustion-enhancing, chemically bound nitro groups to amine groups.

In a typical example, 4.8 grams of organic sludge (comprising deteriorated redwood shingles and polyethylene beads), assayed by calorimetry to contain 0.11 grams of plutonium-238, were treated with 450 milliliters (mls.) of a 0.25 solution of CrCl$_2$ in about 1 M HCl. The solution was passed slowly through the material contained in the reaction tube 18 and allowed to drip slowly from the overflow tube 22 into a suitable container (such as 28). The overflow liquid was saved for its Pu content. After the CrCl$_2$ solution was passed through the material, the organic material 16 was washed with a dilute acid or other wash solution. Washing may be performed to insure the complete removal of all reduced plutonium as well as of the leach solution. In general, once the leach solution has been passed through the organic and plutonium bearing material 16, the material may be washed with a dilute acid or other wash solution. A dilute acid or wash solution may be taken from the group consisting of 0.01 M to 6 M HCl, 0.01 M to saturated solution citric acid, 0.01 M to saturated solution tartaric acid, 0.01 M to saturated solution ascorbic acid, about 0.1 M to about 1 M nitric acid, and other wash solutions such as EDTA, ferrous EDTA, or water. The leach solution was found to contain by alpha count 0.095 grams of isotope, and the remaining sludge only 0.022 gram of plutonium-238 as determined by calorimetry methods. Therefore, more than 80% of the Pu had been recovered with only 450 mls. of leach solution in about 1 hour. A concurrent effect was the reduction of nitro groups (with attendant reduction in fire hazards as discussed below) within the organic material by the reducing agent CrCl$_2$. These nitro groups were reduced to amine groups. Since the reduction of nitro groups or compounds may also be made in citrate or tartrate medium, this medium may be preferred in stainless steel alpha boxes where chloride ions are objectionable. A citrate or tartrate medium may be in the form of an alkali metal citrate or an alkali metal tartrate. As an alternative, the citrate or tartrate ion may be added by means of citric acid or tartaric acid. It may thus be that the leaching solution further contains from about 0.01 M to about 5 M of another compound taken from the group consisting of alkali metal citrate, alkali metal tartrate, citric acid and tartaric acid. Examples of leach solutions containing these ions are from about 0.01 M to about 2 M titanous sulfate in about 2 M citric acid, from about 0.01 M to about 1 M chromous (II) chloride in about 2 M tartaric acid, and from about 0.01 M to about 2 M vanadium (II) sulfate in about 2 M tartaric acid. These examples are shown for illustration solely and are not intended to be restrictive or limiting. Various other combinations of leaching solutions may be made and other combinations suggest themselves from the examples given.

As is well known in the art, many organic materials are susceptible to nitration in HNO$_3$. These organic nitrates may be more of a fire hazard than the original materials. In the case of polyethylene, the combustion hazard increases with the amount of chemically bound oxygen. As stated hereinabove, it has been found that the combustion hazard of many materials, such as polyethylene, is decreased by the addition of organic amines which act as fire retardants. Solutions of chromous (II) ion may reduce organic nitro groups to amine groups and hence, may make less hazardous organic materials which have been exposed to a nitric acid. This reduction is enhanced by the addition of a suitable amount of citrate or tartrate ions preferably in any suitable alkaline solution or EDTA which not only makes the reduction potential more negative (i.e., enhances reducing ability of reducing agent) but also aid in preventing precipitation of the reducing agent ions. Thermal analysis of organic material treated with $CrCl_2$ as above to recover its Pu content showed that the material is less prone to thermal reaction after such treatment than before such treatment.

The $Cr^{+2}$, $V^{+2}$ or $Ti^{+3}$ ions as well as ferrous EDTA reagent are strong reducing agents. The reduction of organic nitrate groups by citrate or tartrate solutions of the above ions may also be effected. Since all of these ions are powerful reducing agents, the recovery system should be operated in a manner to avoid unnecessary exposure of the solution and concurrent reaction with atmospheric oxygen.

$TiCl_3$ may have a double effect in the reaction process, first as a catalyst in the reduction of Pu and nitro groups and, second, since it may be oxidized to a tetravalent form, it may displace Pu or other such radioisotope from its binding sites by competition with the Pu for the sites and may be preferred because of this additional advantage.

Using this invention, Pu recovery may be effected from Pu bearing organic materials. Recovery of the material such as Pu displaced into the leach solution may be effected using resin ion exchange processes, fluoride volatility processes or precipitation processes. A typical process is that described by S. G. Abrahamson in the Journal of Inorganic and Nuclear Chemistry, vol. 29, pages 842–844 (1967).

In the case of some radioisotopes, such as thorium, no chemical reduction of the metal is possible, so that in this case this invention would not have as great an applicability. However, the reduction of chemically bound nitro groups would still be possible, as would complexation of the thorium by citrate, tartrate and EDTA.

What is claimed is:

1. A method for extracting a radioisotopic material taken from the group consisting of plutonium, cerium, americium and thallium from a solid organic material taken from the group consisting of polyethylene, cellulosic materials, and mixtures thereof containing said radioisotopic material, comprising leaching said solid organic material with a leaching solution taken from the group consisting of a soluble non-nitrate salt of titanium (III), chromium (II) and vanadium (II) in an acid solution having the anion as a common ion with the salt used, and ferrous (II) ethylenediaminetetraacetate, said leaching converting nitro groups in said organic material to amine groups thereby reducing combustion properties of said organic materials and yielding a radioisotopic material containing solution, and recovering said radioisotopic material containing solution.

2. The method of claim 1 wherein the leaching solution is taken from the group consisting of from about 0.01 M to about 2.0 M titanium (III) chloride in from greater than 0 M to about 4 M hydrochloric acid, from about 0.01 M to about 1.0 M titanium (III) sulfate in from greater than 0 M to about 3 M sulfuric acid, from about 0.01 M to about 2.0 M chromium (II) chloride in from greater than 0 M to about 1 M hydrochloric acid, from about 0.01 M to about 1 M chromium (II) sulfate in from greater than 0 M to about 2 M sulfuric acid, from about 0.01 M to about 1.0 M vanadium (II) chloride in from greater than 0 M to about 2.0 M hydrochloric acid, from about 0.01 M to about 1.0 M vanadium sulfate in from greater than 0 M to about 4 M sulfuric acid, and from greater than 0 M to about 0.05 M ferrous (II) ethylenediaminetetraacetate in from greater than 0 M to about 0.05 M sodium ethylenediaminetetraacetate.

3. The method of claim 2 wherein the leaching solution further contains from about 0.01 M to about 5 M of another compound taken from the group consisting of an alkali metal citrate, alkali metal tartrate, citric acid, and tartaric acid.

4. The method of claim 1 wherein said leaching is performed at about ambient temperature and said leaching solution is contacted with said organic material at the rate of from about 2 to about 15 milliliters per minute per square centimeter of said organic material.

5. The method of claim 1 including, after said leaching, the additional step of washing the organic material with an acid solution taken from the group consisting of about 0.01 to about 6 M hydrochloric acid, about .01 M to saturated solution citric acid, water, ferrous ethylenediaminetetraacetate, about 0.01 M to about 1 M nitric acid, about 0.01 M to about saturated solution tartaric acid, and about 0.01 M to about saturated solution ascorbic acid, and sodium ethylenediaminetetraacetate.

References Cited
UNITED STATES PATENTS

| | | | |
|---|---|---|---|
| 2,863,718 | 12/1958 | Overholt et al. | 423—7 |
| 3,154,500 | 10/1964 | Jansen et al. | 252—301.1 W |
| 3,183,058 | 5/1965 | Peter | 423—20 |
| 3,432,276 | 3/1969 | Reas | 423—7 |
| 3,173,757 | 3/1965 | Wheelwright et al. | 423—7 |
| 3,580,705 | 5/1971 | Coleman et al. | 252—301.1 R X |

CARL D. QUARFORTH, Primary Examiner

R. L. TATE, Assistant Examiner

U.S. Cl. X.R.

252—301.1 W; 423—20